(12) United States Patent
Agarwal

(10) Patent No.: US 11,194,482 B1
(45) Date of Patent: Dec. 7, 2021

(54) STORAGE SYSTEM AND METHOD FOR SEGREGATING OUTLIERS IN A VIRTUALIZATION SYSTEM

(71) Applicant: Western Digital Technologies, Inc., San Jose, CA (US)

(72) Inventor: Dinesh Kumar Agarwal, Karnataka (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/890,246

(22) Filed: Jun. 2, 2020

(51) Int. Cl.
*G06F 12/00* (2006.01)
*G06F 3/06* (2006.01)
*G06F 9/455* (2018.01)

(52) U.S. Cl.
CPC .......... *G06F 3/0619* (2013.01); *G06F 3/064* (2013.01); *G06F 3/0631* (2013.01); *G06F 3/0664* (2013.01); *G06F 3/0679* (2013.01); *G06F 9/45558* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 8,892,811 B2 | 11/2014 | Ish et al. | |
| 9,003,071 B2 | 4/2015 | Liu | |
| 2013/0061019 A1 | 3/2013 | Fitzpatrick et al. | |
| 2013/0132655 A1 | 5/2013 | Belluomini et al. | |
| 2017/0024132 A1* | 1/2017 | Jun | G06F 3/0604 |
| 2017/0228159 A1* | 8/2017 | Tanaka | G06F 3/0659 |

* cited by examiner

*Primary Examiner* — Daniel D Tsui
(74) *Attorney, Agent, or Firm* — Crowell & Moring LLP

(57) ABSTRACT

A storage system and method for segregating outliers in a virtualization system are presented. In one embodiment, a storage system is provided comprising a memory and a controller. The controller is configured to track a write amplification caused by each of a plurality of virtual machines; determine that a write amplification of one of the plurality of virtual machines is outside of an acceptable write amplification range; and perform a corrective action to reduce write amplification of the one of the plurality of virtual machines. Other embodiments are provided.

20 Claims, 10 Drawing Sheets

STORAGE SYSTEM AND METHOD FOR SEGREGATING OUTLIERS IN A VIRTUALIZATION SYSTEM

BACKGROUND

A storage system can be used in a virtualization environment with a plurality of virtual machines. This allows the plurality of virtual machines to share the memory of the storage system.

DETAILED DESCRIPTION

Overview

Figure 1A:
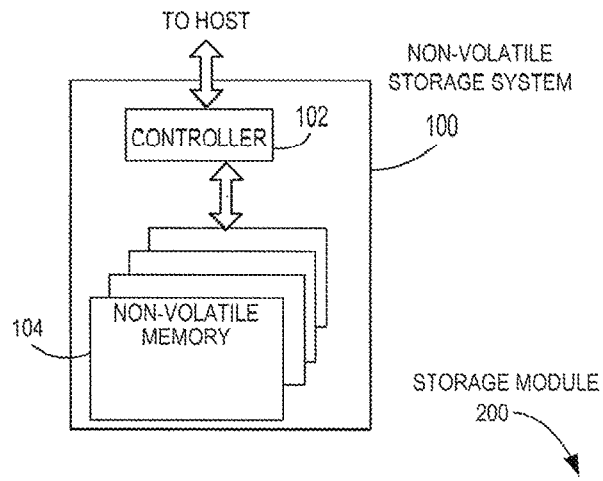
FIG. 1A is a block diagram of a non-volatile storage system of an embodiment.

By way of introduction, the below embodiments relate to a storage system and method for segregating outliers in a virtualization system. In one embodiment, a storage system is provided comprising a memory and a controller. The controller is configured to track a write amplification caused by each of a plurality of virtual machines; determine that a write amplification of one of the plurality of virtual machines is outside of an acceptable write amplification range; and perform a corrective action to reduce write amplification of the one of the plurality of virtual machines.

In some embodiments, the controller is further configured to notify a host that the write amplification of the one of the plurality of virtual machines is outside of the acceptable write amplification range.

In some embodiments, the corrective action is triggered by the host.

In some embodiments, the corrective action is performed independent of the host.

In some embodiments, the corrective action comprises allocating additional memory to reduce write amplification of the one of the plurality of virtual machines.

In some embodiments, the corrective action comprises changing an endurance group in the memory.

In some embodiments, the controller is further configured to segregate a block storing data from the one of the plurality of virtual machines from other blocks in the memory.

In some embodiments, the segregated block stores data from another one of the plurality of virtual machines, and wherein the controller is further configured to invalidate or move the data.

In some embodiments, the controller is further configured to track write application by tracking valid host data written in the memory and storage-system-generated data written in the memory.

In some embodiments, the controller is further configured to determine the acceptable write amplification range from the tracked write amplifications.

In some embodiments, the memory comprises a three-dimensional memory.

In another embodiment, a method is provided that is performed in a storage system comprising a memory. The method comprises: determining that a write amplification of one of a plurality of virtual hosts is greater than a threshold; and in response to determining that the write amplification of the one of the plurality of virtual hosts is greater than the threshold, reducing the write amplification of the one of the plurality of virtual hosts.

In some embodiments, reducing the write amplification is triggered by a host running the plurality of virtual hosts after the storage system notifies the host that the write amplification of the one of the plurality of virtual hosts is greater than the threshold.

In some embodiments, reducing the write amplification is performed by the storage system without interaction with the host.

In some embodiments, the write amplification is reduced by performing at least one of the following: allocating additional memory and changing an endurance group in the memory.

In some embodiments, the method further comprises segregating a block storing data from the one of the plurality of hosts from other blocks in the memory.

In another embodiment, a storage system is provided comprising a memory and means for performing a corrective action to reduce write amplification of one of a plurality of virtual machines whose write amplification is outside of an acceptable write amplification range.

In some embodiments, the corrective action comprises at least one of allocating additional memory and changing an endurance group in the memory.

In some embodiments, the storage system further comprises means for segregating a block storing data from the one of the plurality of virtual machines from other blocks in the memory.

In some embodiments, the storage system further comprises means for tracking write amplification caused by each of the plurality of virtual machines.

Other embodiments are possible, and each of the embodiments can be used alone or together in combination. Accordingly, various embodiments will now be described with reference to the attached drawings.

Embodiments

Figure 1B:
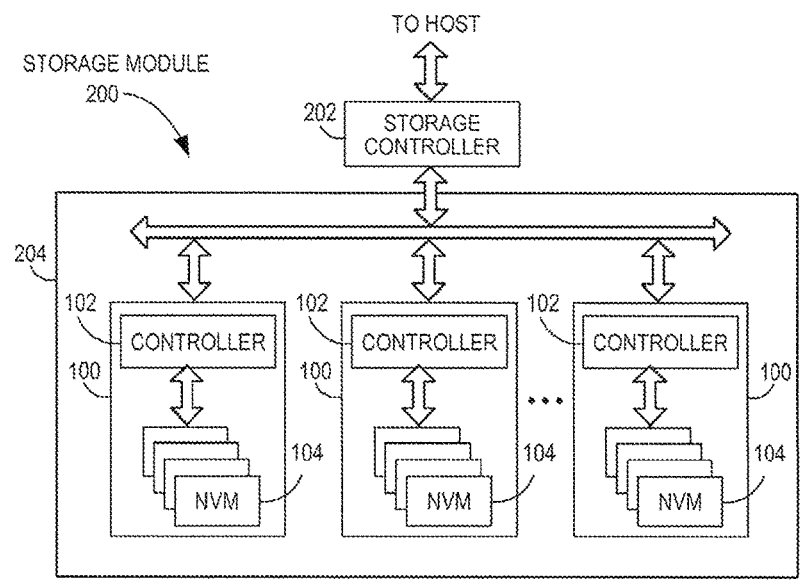
FIG. 1B is a block diagram illustrating a storage module of an embodiment.
Figure 1C:
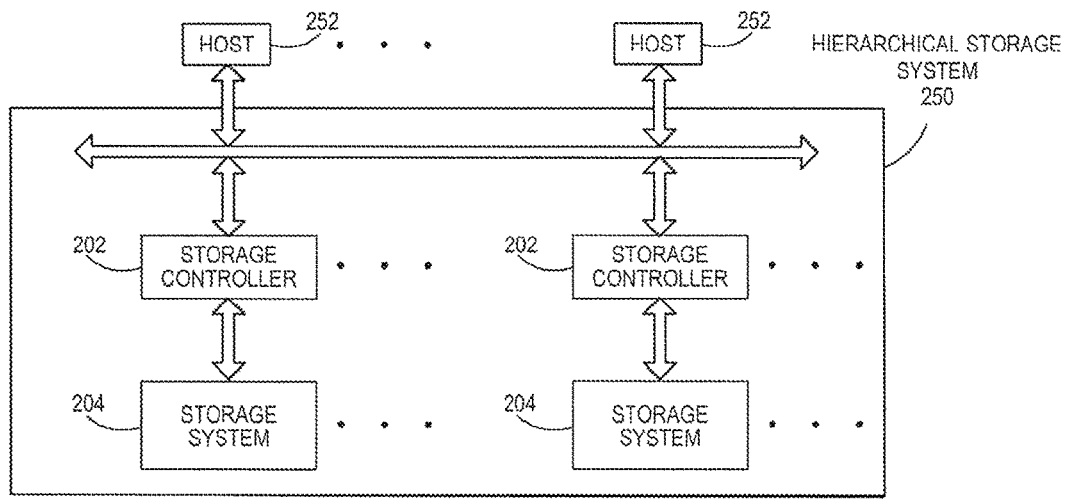
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
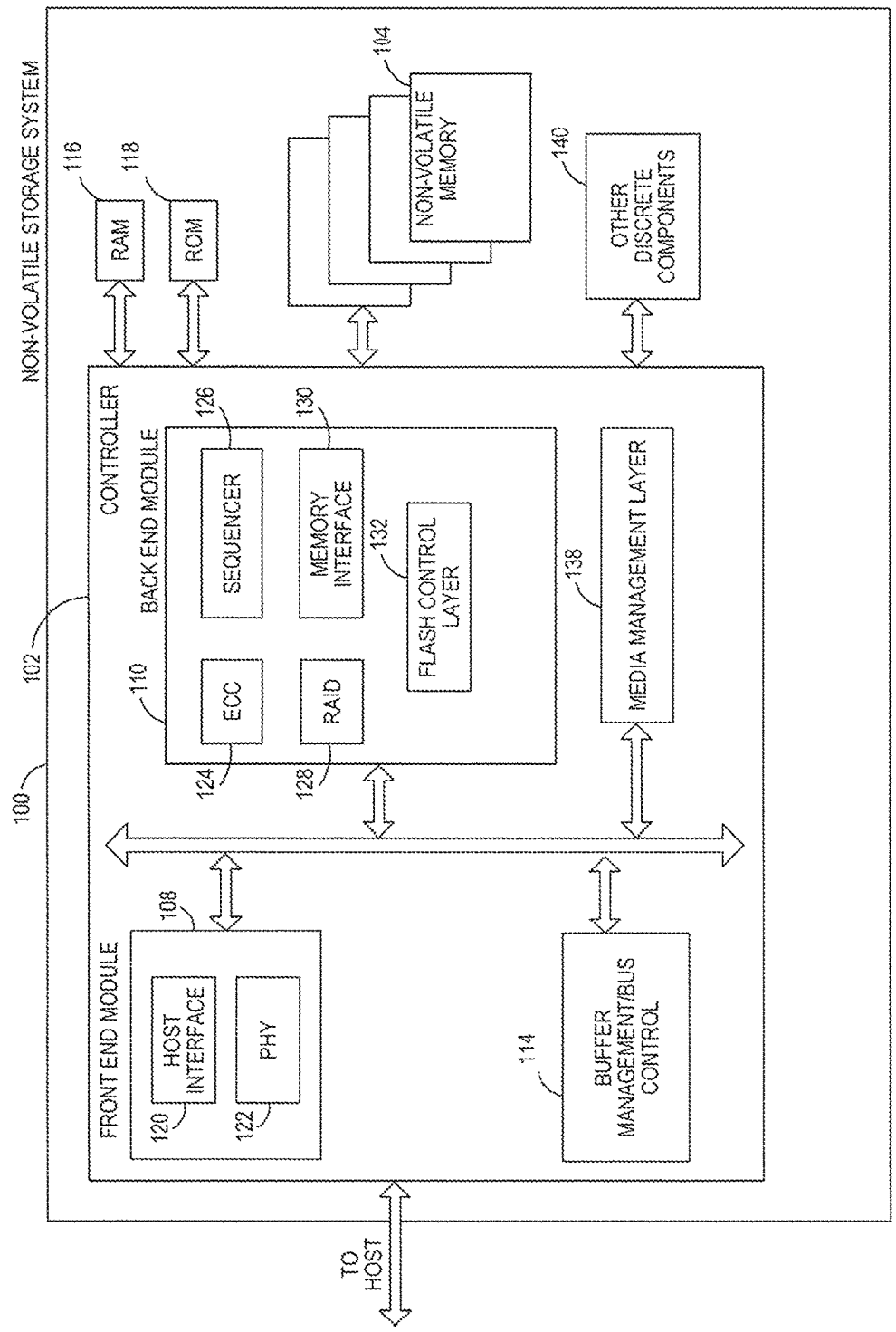
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 can be implemented in hardware and/or software (e.g., in a processor executing computer-readable program code) to implement the methods and algorithms described below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
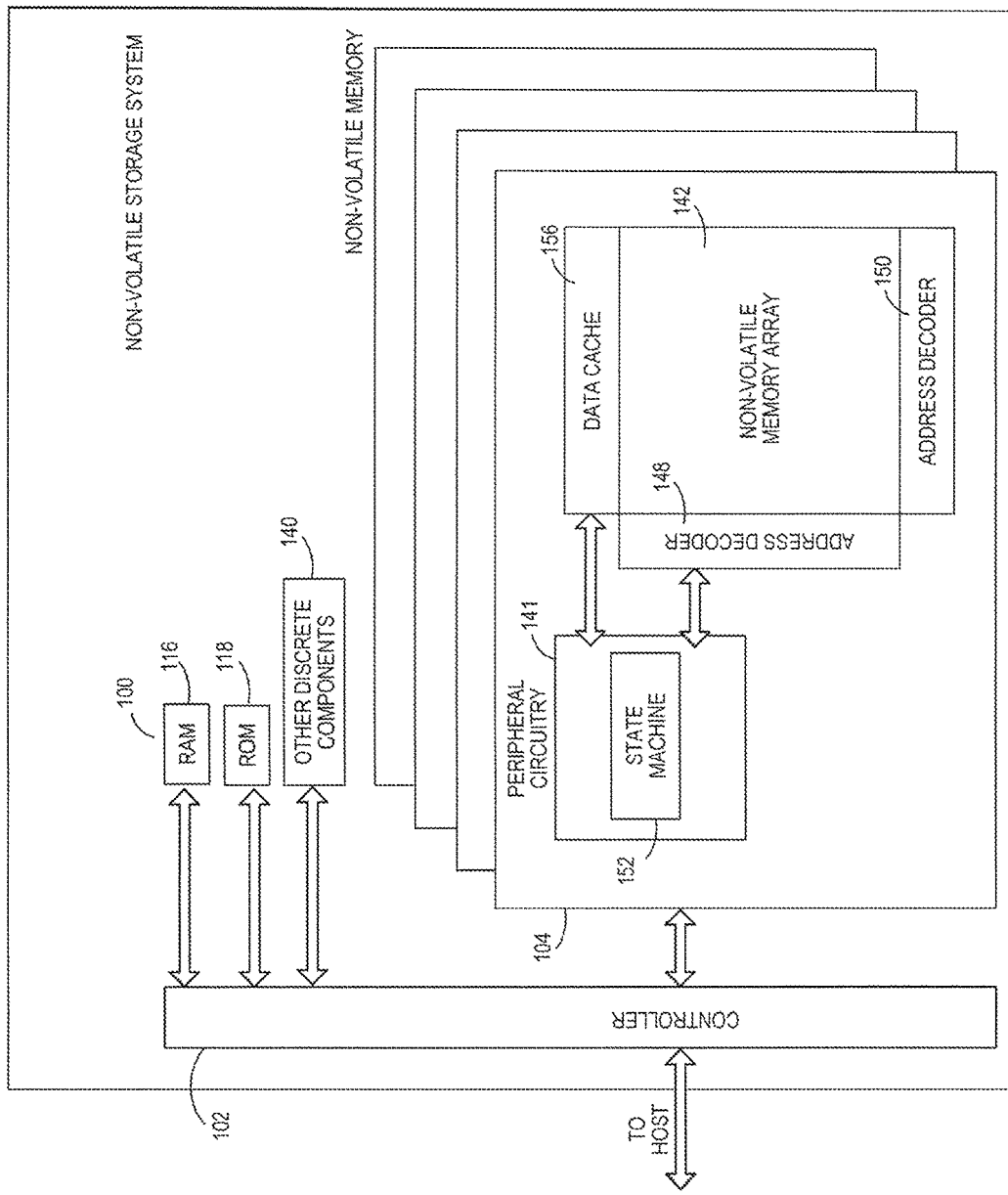
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
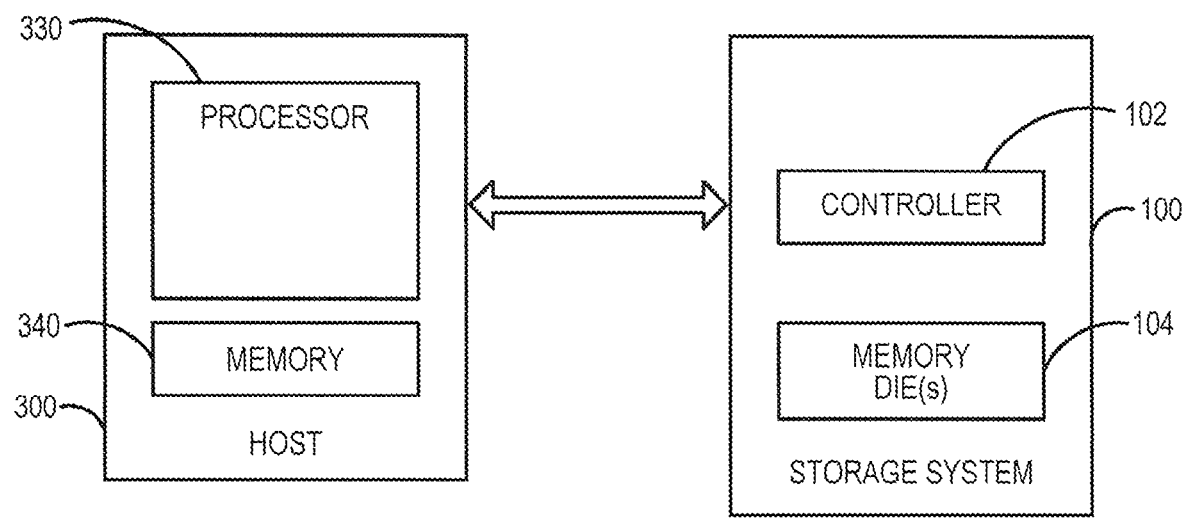
FIG. 3 is a block diagram of a host and storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. In one embodiment, the host 300 comprises an image capture device 390 (e.g., a camera) to take a picture, and the processor 330 generates a digital image representing that picture. The image can be stored in the memory 340 prior to sending the image to the storage system 100 (e.g., a memory card or an embedding storage device) for storage.

Figure 4:
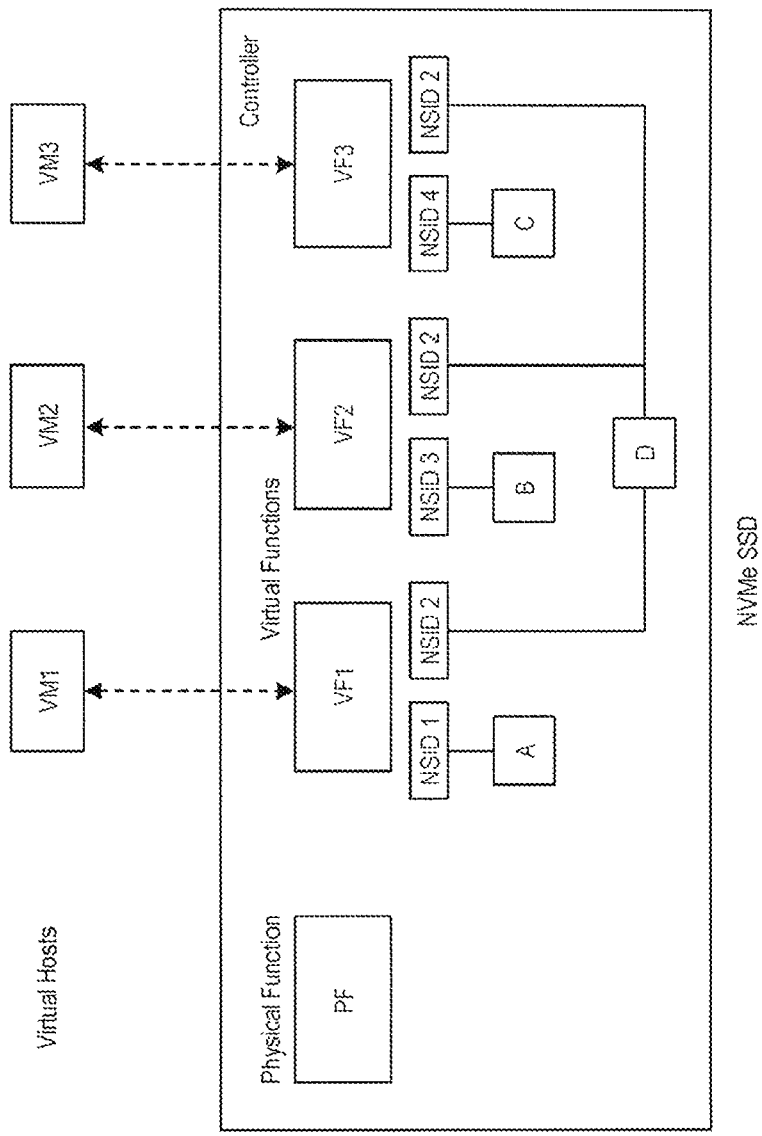
FIG. 4 is a block diagram of a virtualization environment of an embodiment.

As mentioned above, a storage system can be used in a virtualization environment with a plurality of virtual machines. This allows the plurality of virtual machines to share the memory of the storage system. One such virtualization environment is provided for in the Non-Volatile Memory Express (NVMe) standard. With NVMe virtualization, the storage system 100 can be used by a plurality of virtual hosts, which gives the benefit to many virtual machines (VMs) to share the memory 104 of the storage system 100. FIG. 4 is a block diagram that illustrates this sharing. Of course, this is just one example, and other variations where hosts share storage capacity can be used.

As shown in FIG. 4, the controller 102 of the storage system 100 is in communication with a plurality of virtual machines (here, three: VM1, VM2, and VM3) running on the host 300. The controller 102 implements a virtual function (VF1, VF2, V3) for each respective virtual machine. The controller 102 also implements a physical function (PF). Each virtual function is an application with one or more namespace identifiers (NSID) for areas of the memory 104. In this example, VF1 is associated with NSIDs 1 and 2, VF2 is associated with NSIDs 3 and 2, and VF3 is associated with NSIDs 4 and 2. So, memory regions A, B, and C are only used by VF1, VF2, and VF3, respectively, and memory region D is shared by all three virtual functions.

While virtualization has many advantages, sharing memory capacity can present some challenges. For example, when more virtual hosts are added, the memory 104 of the storage system 100 may be used differently. Also if the storage system 100 advertises a certain life with a given workload, one misbehaved virtual host may introduce degradation in the entire storage system 100 and affect the other well-behaved virtual hosts. In this situation, the storage system 100 may not be able to meet the expected life for the given load of the other virtual hosts in the specified endurance group earlier selected by the host 300.

Figure 5:
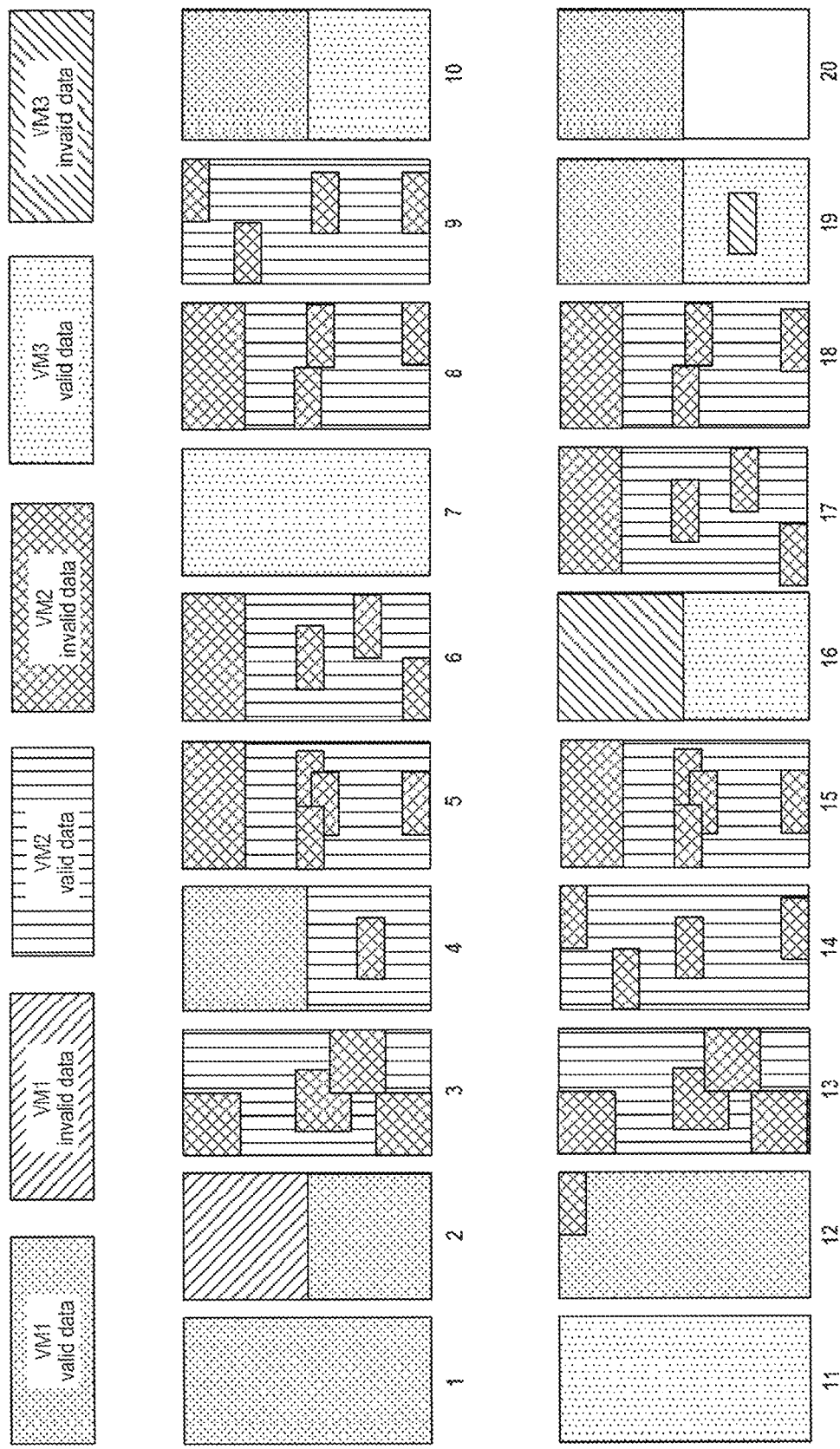
FIG. 5 is an illustration of a plurality of blocks of memory of a storage system of an embodiment storing data from three virtual machines.

FIG. 5 provides a drawing that illustrates this problem. In this example, three virtual machines (VM1, VM2, VM3) write different kinds of data, and a memory partition is shared (e.g., to maximize the performance and to share the same memory capacity). In this situation, one virtual machine can impact the storage capacity more than the others, which are impacted by not seeing the expected endurance. In this example, VM3 is writing more fragmented data than VM1 and VM2. Even if VM1 and VM2 write largely less-fragmented data, VM1 and VM2 will still be negatively impacted by VM1, and the overall performance of the storage system 100 will quickly degrade fast because of the one misbehaved virtual host.

When a storage system is shared in such a fashion, there is typically no specific management to track the endurance per virtual host. That is, all writes/reads are performed without having any specific management in the storage system. One way to address this problem is at the protocol level by controlling the flow of the commands to the storage system 100. However, this approach does not address problems that arise after data is written into the storage system and how the storage system's performance can be kept in control.

The following embodiments can be used to address this situation. Specifically, in one embodiment, the controller 102 in the storage system 100 is informed of security/performance issues of a misbehaved virtual host or machine that may influence the life of the storage system 100. The controller 102 keeps track of the write amplification caused by each virtual machine and, based on the write amplification caused by each virtual machine, the normal functioning range is decided for the set of virtual machines. If for any of the virtual hosts, the range is different from the group, the controller 102 can segregate the data blocks of that virtual host and take corrective measures (as instructed by the host 300 or independent from the host 300) to correct the abnormality. Such corrective actions can include, but are not limited to, allocating more memory (e.g., spare blocks) and shifting the endurance group of the memory. This can save the storage system 100 from fast degradation and can improve endurance for other well-behaved virtual hosts. As used herein, an endurance group is a collection of namespaces and unallocated storage. Each endurance group has a separate pool of blocks for wear-leveling purposes and its own dedicated pool of spare blocks.

Figure 6:
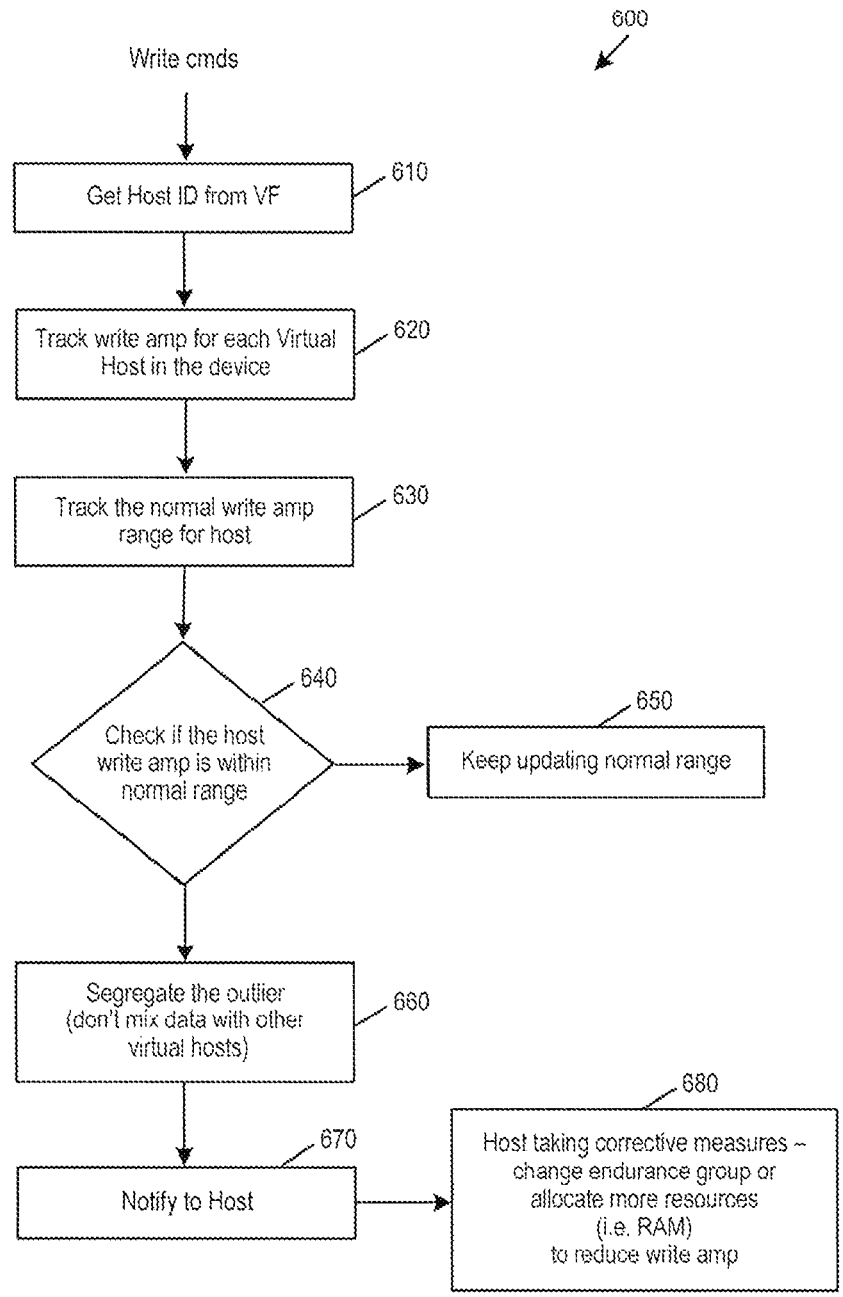
FIG. 6 is a flow chart of a method of an embodiment for segregating outliers in a virtualization system.

FIG. 6 is a flow chart 600 of a method of an embodiment for segregating outliers in a virtualization system. As shown in FIG. 6, the controller 102 in the storage system 100 gets write commands from the host 300 and gets the host identifier (ID) for each of the virtual functions of the virtual machines/hosts (act 610). The controller 102 then tracks the write amplification of each virtual host running in the storage system (device) 100 (act 620). As used herein, write amplification refers to the total storage-system-generated data (e.g., garbage collection data, control writes, padding, data movement, etc.) written in the memory 104 for a given virtual host divided by the total valid data written in the memory 104. In one example, write amplification is maintained by tracking some additional metadata for each virtual host. In this way, the controller 102 can identify incoming commands and associate them with a virtual function. With all of this information, the controller 102 can track the normal/acceptable write amplification range of the plurality of virtual hosts (act 630) and check to see if the write amplification for a given virtual function is an outlier (act 640). For example, an acceptable range can be where most of the virtual machines/endurance groups are functioning (e.g., a write amplification of 1 or 2). In such a case, the controller 102 keeps updating the normal/acceptable range (act 650). However, an outlier can be where the write amplification of a virtual host is significantly different from the normal range (e.g., greater than 3). In such a case, the controller 102 can segregate the blocks storing data for that virtual function from the other blocks in the memory 104 (act 660). The controller 102 can then notify the host 300 (act 670), which can instruct the controller 102 to take a corrective action, such as, but not limited to, changing an endurance group of the memory and/or allocate more memory to reduce write amplification (act 680).

Figure 7:
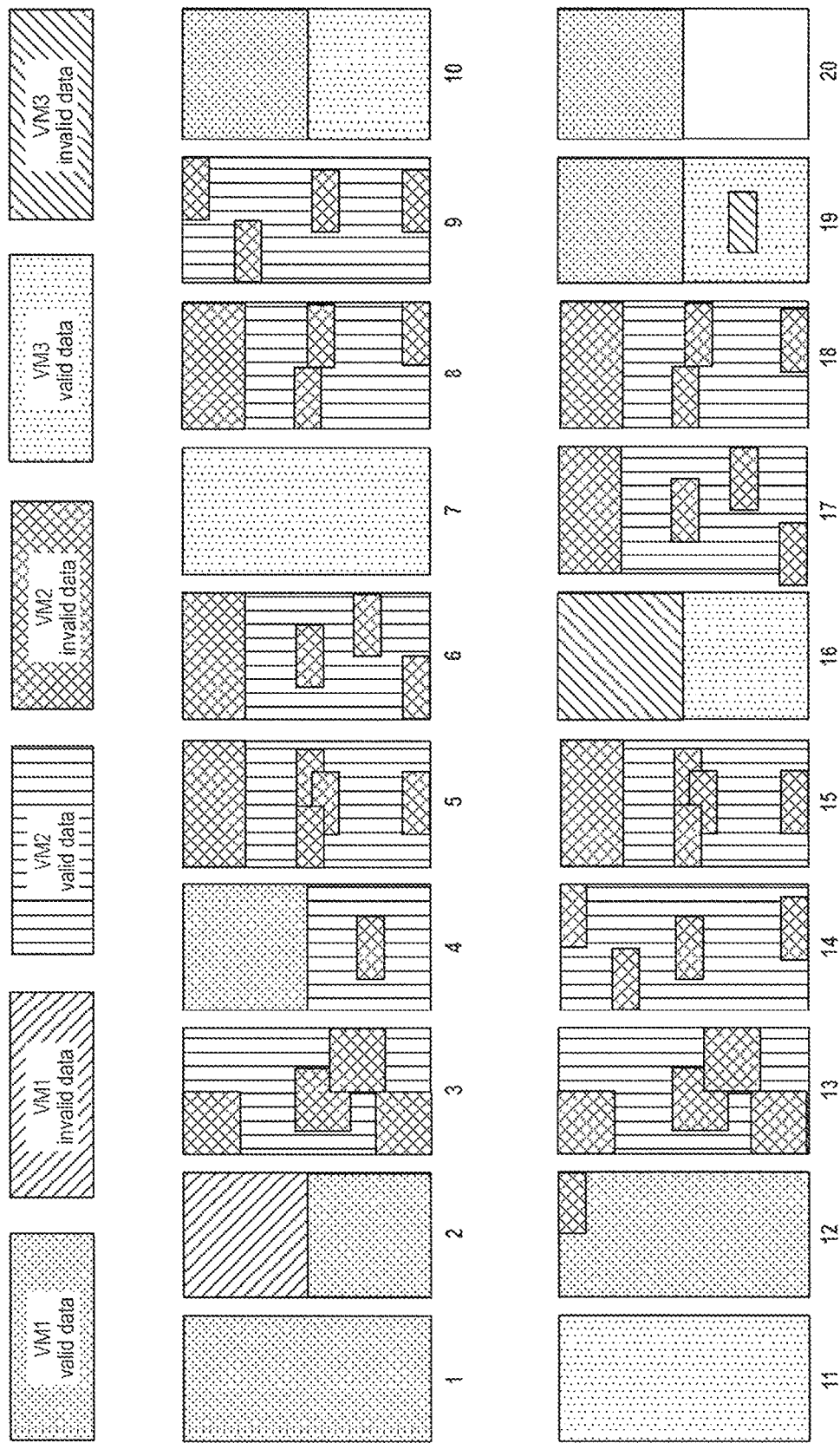
FIG. 7 is an illustration of a plurality of blocks of memory of a storage system of an embodiment storing data from three virtual machines.
Figure 8:
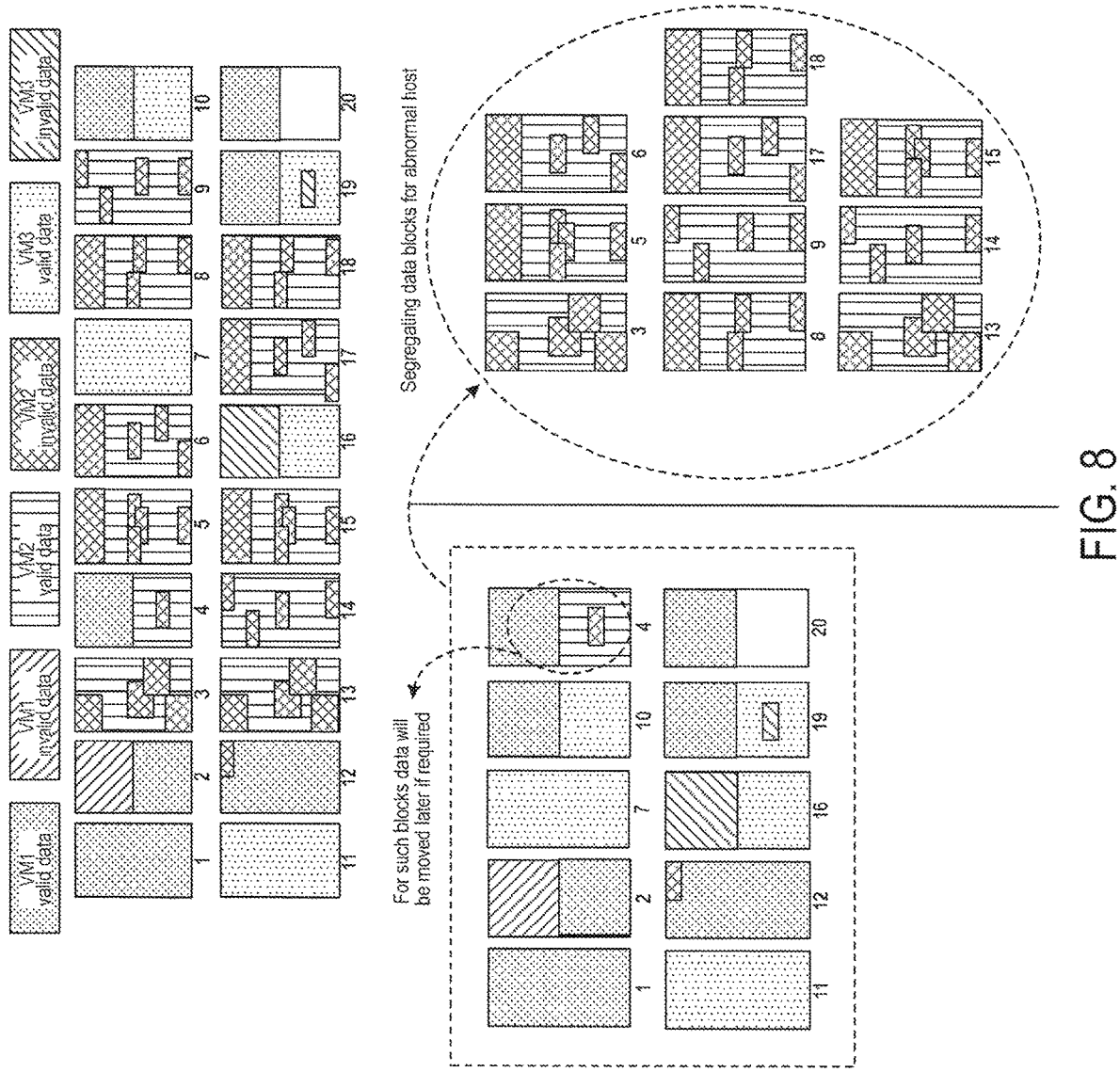
FIG. 8 is an illustration of a plurality of blocks of memory of a storage system of an embodiment showing a data block segregation method.

This process is illustrated in FIGS. 7 and 8. FIG. 7 shows a plurality of blocks of the memory 104 and their usage by each of three virtual machines (VM1, VM2, and VM3). Here, VM1 and VM2 write similar workloads and constitute the normal range, and VM3 is identified as an outlier. Once the outlier is detected, the data blocks for the outlier are segregated and further data for that virtual host is not mixed with data of other virtual hosts. In this example, some of the blocks that have data from multiple hosts can be invalidated automatically, or, if required, the data can be is moved to another block. So, after segregating the data blocks for the abnormal virtual host, the data for that virtual host is not mixed with other virtual hosts, and extra over-provisioned blocks can be allocated to control the write amplification.

After segregating the blocks, the controller 102 notifies the host 300 and can take correcting action, so the overall life of the storage system 100 does not get impacted. For example, the controller 102 can allocate spare blocks to reduce write amplification or add extra random access memory (RAM) or cache to do more consolidation to correct the write amplification. If write amplification abnormality is not corrected, further corrective measurements can be taken, such as shifting the endurance group of the virtual host.

Figure 9:
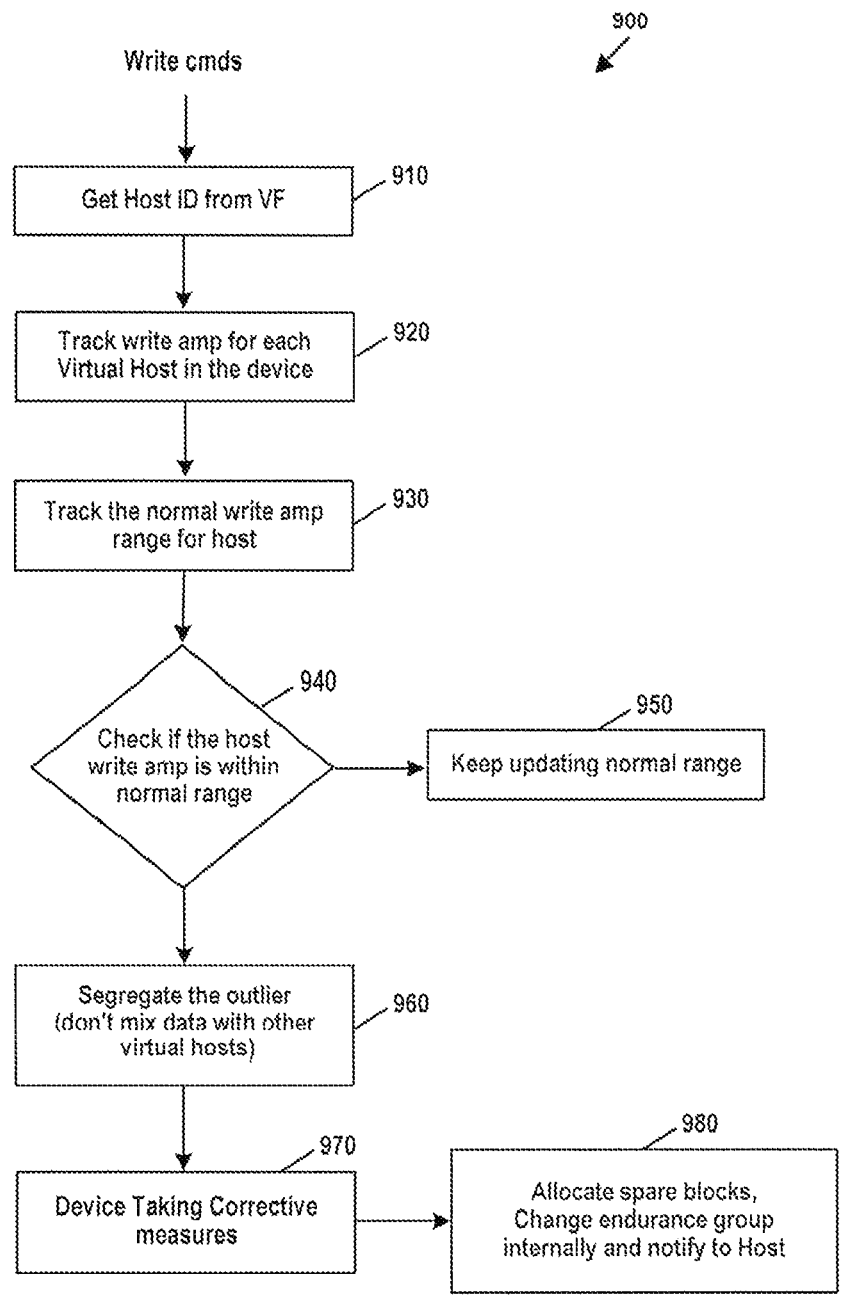
FIG. 9 is a flow chart of a method of an embodiment for segregating outliers in a virtualization system.

It should be noted that, in the above example, corrective action was triggered by the host 300 after the controller 102 informed the host 300 of the outlier. In another embodiment, the controller 102 takes corrective action independent of the host 300. This alternative is shown in the flow chart 900 in FIG. 9. Acts 910-960 in this flow chart 900 are similar to acts 610-660 in the flow chart 600 in FIG. 6. However, as shown in acts 970 and 980, in this embodiment, the controller 102 of the storage system 100 takes the correction actions without notifying and taking instruction from the host 300.

As can be seen by the above example, by tracking the write amplification ratio for each virtual host, an abonormality can be detected, and any outlier virtual host can be moved to a different endurance group and/or the abnomality can be corrected by providing extra measures, such as spare blocks or RAM or other resources. All these measures can be used to provide improved endurance for the storage system 100 (e.g., by segregating the outlier and taking corrective measures) and save it from fast degradation (e.g., by segregating the outlier and moving it to the appropriate endurance group). Quality of service can also increase for well-behaved virtual hosts by increased system performance and reduced latency. Additionally, because the storage system 100 of these embodiments puts more load to the misbehaved virtual host and preserves the life/latency of the well-behaved virtual hosts, these embodiment can provide additional security from degradation.

Finally, as mentioned above, any suitable type of memory can be used.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention.

It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
   a memory; and
   a controller configured to communicate with the memory and further configured to:
   track a write amplification caused by each of a plurality of virtual machines;
   determine that a write amplification of one of the plurality of virtual machines is outside of an acceptable write amplification range;
   perform a corrective action to reduce write amplification of the one of the plurality of virtual machines; and
   notify a host that the write amplification of the one of the plurality of virtual machines is outside of the acceptable write amplification range.

2. The storage system of claim 1, wherein the corrective action is performed independent of the host.

3. The storage system of claim 1, wherein the corrective action comprises allocating a spare block to reduce write amplification of the one of the plurality of virtual machines.

4. The storage system of claim 1, wherein the corrective action comprises changing an endurance group in the memory.

5. The storage system of claim 1, wherein the controller is further configured to segregate a block storing data from the one of the plurality of virtual machines from other blocks in the memory.

6. The storage system of claim 5, wherein the segregated block stores data from another one of the plurality of virtual machines.

7. The storage system of claim 6, wherein the controller is further configured to invalidate the data.

8. The storage system of claim 6, wherein the controller is further configured to move the data.

9. The storage system of claim 1, wherein the controller is further configured to track write amplification by tracking valid host data written in the memory and storage-system-generated data written in the memory.

10. The storage system of claim 1, wherein the controller is further configured to determine the acceptable write amplification range from the tracked write amplifications.

11. The storage system of claim 1, wherein the memory comprises a three-dimensional memory.

12. The storage system of claim 1, wherein the memory is configured to be integrated in the storage system.

13. The storage system of claim 1, wherein the corrective action is triggered by the host.

14. A method comprising:
   performing the following in a storage system comprising a memory:
   determining that a write amplification of one of a plurality of virtual hosts is greater than a threshold; and
   in response to determining that the write amplification of the one of the plurality of virtual hosts is greater than the threshold, reducing the write amplification of the one of the plurality of virtual hosts;
   wherein reducing the write amplification is triggered by a host running the plurality of virtual hosts after the storage system notifies the host that the write amplification of the one of the plurality of virtual hosts is greater than the threshold.

15. The method of claim 14, wherein reducing the write amplification is performed by the storage system without interaction with the host.

16. The method of claim 14, wherein the write amplification is reduced by allocating a spare block.

17. The method of claim 14, further comprising segregating a block storing data from the one of the plurality of hosts from other blocks in the memory.

18. The method of claim 14, wherein the write amplification is reduced by changing an endurance group in the memory.

19. The method of claim 14, wherein the memory comprises a three-dimensional memory.

20. A storage system comprising:
   a memory;
   means for performing a corrective action to reduce write amplification of one of a plurality of virtual machines whose write amplification is outside of an acceptable write amplification range; and
   means for segregating a block storing data from the one of the plurality of virtual machines from other blocks in the memory.

* * * * *